US012660835B2

(12) United States Patent
Hansen et al.

(10) Patent No.: US 12,660,835 B2
(45) Date of Patent: Jun. 23, 2026

(54) STABILIZED OIL AND METHODS OF MAKING THE SAME

(71) Applicant: CARGILL, INCORPORATED, Wayzata, MN (US)

(72) Inventors: Steven Lee Hansen, Chanhassen, MN (US); Diliara Iassonova, Maple Grove, MN (US); Gregg Perri, Plymouth, MN (US); Ying Joy Zhong, Olathe, KS (US)

(73) Assignee: Cargill, Incorporated, Wayzata, MN (US)

( * ) Notice: Subject to any disclaimer, the term of this patent is extended or adjusted under 35 U.S.C. 154(b) by 59 days.

(21) Appl. No.: 18/150,443

(22) Filed: Jan. 5, 2023

(65) Prior Publication Data

US 2023/0148620 A1 May 18, 2023

Related U.S. Application Data

(63) Continuation of application No. 15/516,236, filed as application No. PCT/US2015/052836 on Sep. 29, 2015, now Pat. No. 11,571,003.

(60) Provisional application No. 62/168,162, filed on May 29, 2015, provisional application No. 62/058,460, filed on Oct. 1, 2014.

(51) Int. Cl.

| | |
|---|---|
| ***A23D 7/005*** | (2006.01) |
| ***A23D 7/04*** | (2006.01) |
| ***C11B 5/00*** | (2006.01) |

(52) U.S. Cl.
CPC ............. *A23D 7/0053* (2013.01); *A23D 7/04* (2013.01); *C11B 5/00* (2013.01); *C11B 5/0007* (2013.01); *C11B 5/0028* (2013.01); *C11B 5/0035* (2013.01); *C11B 5/0071* (2013.01); *C11B 5/0085* (2013.01)

(58) Field of Classification Search
CPC .......... A23D 7/0053; A23D 7/04; C11B 5/00; C11B 5/0007; C11B 5/0028; C11B 5/0035; C11B 5/0071; C11B 5/0085
See application file for complete search history.

(56) References Cited

U.S. PATENT DOCUMENTS

| | | | | |
|---|---|---|---|---|
| 2006/0153964 | A1 | 7/2006 | Repo | |
| 2007/0141223 | A1 * | 6/2007 | Moore | C11B 5/0085 426/601 |
| 2009/0215885 | A1 | 8/2009 | Bendheim | |
| 2010/0178369 | A1 | 7/2010 | Arledge | |
| 2011/0212183 | A1 | 9/2011 | Breivik | |
| 2011/0280950 | A1 | 11/2011 | Reznik | |
| 2017/0295812 | A1 | 10/2017 | Perri | |

FOREIGN PATENT DOCUMENTS

| | | | | |
|---|---|---|---|---|
| EP | 2025237 | A1 | 2/2009 | |
| JP | 2006333792 | A | 12/2006 | |
| WO | 2004052116 | A1 | 6/2004 | |
| WO | 2010033034 | A1 | 3/2010 | |
| WO | 2013066373 | A1 | 5/2013 | |
| WO | 2014022505 | A1 | 2/2014 | |
| WO | WO-2016053971 | A1 * | 4/2016 | A23D 7/0053 |

OTHER PUBLICATIONS

Frankel et al., "Antioxidant Activity of Rosemary Extract and its Constituents, Carnosic Acid, Carnosol, and Rosmarinic Acid in Bulk Oil and Oil-in-Water Emulsion". Journal of Food Chem. 1996, 44, pp. 131-135. (Year: 1996).*
Gautam et al., "Anti-Inflammatory, Cyclooxygenase (COX)-2, COX-1 inhibitory, and Free Radical Scavenging Effects of Rumex nepalensis". Planta Med. 2010; 76: 1564-1569. (Year: 2010).*
Marinas et al. "Antimicrobial and antioxidant activity of the vegetative and reproductive organs of Robinia pseudoacacia". J. Serbian Chemical Society 79(11) 1363-1378 (2014) (Year: 2014).*
Liu et al., "Characterization and antioxidant activity of dihydromyricetin-lecithin complex". Eur. Food Res. Technol (2009) 230:325-331. (Year: 2009).*
Bartee et al. Effects of Antioxidants on the Oxidative Stability of Oils Containing Arachidonic, Docosapentaenoic and Docosahexaenoic Acids, Journal of American Oil Chemical Society (2007) 84, 363-368 (Year 2007).
Everette I. Evans, Antioxidant Properties of Vegetable Lecithin, Ind. Eng. Chem. 1935, 27, 3, 329-331 (Year 1935).
Frankel, et al. Antioxidant Activity of a Rosemary Extract and its Constituents, Camosic Acid, Carnosol and Rosmarinic Acid, in Bulk Oil and Oil-in-Water Emulsion, J. Agric. Food Chem 1996, 44, 131-135 (Year 1996).
Yin et al., Green Tea Extract as Food Antioxidant Synergism and Antagonism with A-Tocopherol in Vegetable Oils and Their Colloidal Systems, Food Chemistry 135 (2012) 2195-2202 (Year 2012).
Drinda, Heike , et al., "Antioxidant properties of lipoic and dihydrolipoic acid in vegetable oils and lard", Zeitschrift Fuer Lebensmittel-Untersuchung Und-Forschung. A,European Food Research and Technology, Springer, Heidelberg, DE, (1999), vol. 208., 1999, 270-276.
Yanishlieva, Nedyalka V. , et al., "Stabilisation of edible oils with natural antioxidants", European Journal of Lipid Science and Technology, vol. 103, Issue 11, Nov. 2001, 257-767.
NPL "Essential Fatty Acids". Available online at https://www.stewartnutrition.co.uk/treating_nutritional_deficiencies/essential_fatty_acids.html on Sep. 19, 2008. (Year: 2008).

* cited by examiner

*Primary Examiner* — Erik Kashnikow
*Assistant Examiner* — Assaf Zilbering

(57) ABSTRACT

Stabilized oils including an edible oil and an antioxidant composition comprising α-lipoic acid and least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin, and methods of preparing such stabilized edible oils. The stabilized oils may have an Oxidative Stability Index ("OSI") at 110° C. of at least 30 hours.

29 Claims, No Drawings

STABILIZED OIL AND METHODS OF MAKING THE SAME

CROSS REFERENCE TO RELATED APPLICATIONS

This application is a Continuation of U.S. patent application Ser. No. 15/516,236, filed Mar. 31, 2017 and entitled STABILIZED OIL AND METHODS OF MAKING THE SAME, which is a national phase application of PCT/US2015/052836, filed Sep. 29, 2015 and entitled STABILIZED OIL AND METHODS OF MAKING THEREOF, which claims the benefit of U.S. Provisional Patent Application Ser. No. 62/058,460, filed Oct. 1, 2014, entitled STABILIZED OIL AND METHODS OF MAKING THE SAME, and U.S. Provisional Patent Application Ser. No. 62/168,162, filed May 29, 2015, entitled STABILIZED OIL AND METHODS OF MAKING THE SAME, which applications are hereby incorporated by reference herein in their entirety.

TECHNICAL FIELD

The present disclosure relates generally to a stabilized oil including an edible oil and an antioxidant composition comprising α-lipoic acid and methods of making the same.

BACKGROUND

Rancidification of edible oils and fats, as well as the foods that contain edible oils and fats, is a significant problem in food industries. This is particularly the case because of the increasing emphasis on the use of polyunsaturated oils due to their perceived health benefits, as the oxidative stability of a fatty acid generally decreases noticeably as the degree of unsaturation increases.

Omega-3 fatty acids, also referred to as n-3 fatty acids, are polyunsaturated fatty acids having a carbon-carbon double bond in the third position from the end of the carbon chain. From a nutritional standpoint, the most important omega-3 fatty acids are probably α-linolenic acid ("ALA"), eicosapentaenoic acid ("EPA"), and docosahexaenoic acid ("DHA"). ALA is an 18-carbon fatty acid moiety having three carbon-carbon double bonds (commonly referred to as C18:3 in shorthand notation), one of which is at the n-3 position. EPA is a 20-carbon fatty acid moiety having 5 carbon-carbon double bonds ("C20:5") and DHA is a 22-carbon fatty acid moiety having 6 carbon-carbon double bonds ("C22:6").

Unfortunately, ALA, EPA, and DHA are all polyunsaturated fats that tend to oxidize fairly readily. EPA (with 5 carbon-carbon double bonds) is significantly more prone to oxidation than ALA; DHA (with 6 carbon-carbon double bonds) is even more prone to oxidation than EPA. As a consequence, increasing the omega-3 fatty acid content tends to reduce the shelf life of many food products. These problems become particularly acute with oils including significant amounts of EPA and DHA.

SUMMARY

In one aspect, provided is a stabilized oil including an edible oil and an antioxidant composition, where the antioxidant composition comprises α-lipoic acid and least one of ascorbyl palmitate, green tea extract, lecithin, ascorbic acid, and rosemary extract.

In another aspect, provided is a stabilized oil including an edible oil and an antioxidant composition, where the antioxidant composition comprises α-lipoic acid and least one of 1,2,4-benzenetriol, carnosic acid, dihydromyricetin, dihydrorobinetin, epigallocatechin, gallic acid, 3-hydroxytyrosol, myricetin, and nepodin.

In another aspect, provided are methods for preparing a stabilized oil, the method comprising providing an edible oil, and adding an antioxidant composition to the edible oil to provide a stabilized oil, where the antioxidant composition comprises α-lipoic acid and least one of ascorbic acid, ascorbyl palmitate, green tea extract, lecithin, and rosemary extract.

In another aspect, provided are methods for preparing a stabilized oil, the method comprising providing an edible oil, and adding an antioxidant composition to the edible oil to provide a stabilized oil, where the antioxidant composition comprises α-lipoic acid and least one of 1,2,4-benzenetriol, carnosic acid, dihydromyricetin, dihydrorobinetin, epigallocatechin, gallic acid, 3-hydroxytyrosol, myricetin, and nepodin.

DETAILED DESCRIPTION

Stabilized edible oils and methods of stabilizing edible oils are disclosed. As described herein, stabilized oils can be prepared by adding an antioxidant mixture to an edible oil, the antioxidant mixture comprising α-lipoic acid and at least one of ascorbic acid, ascorbyl palmitate, green tea extract, lecithin, and rosemary extract, or the antioxidant mixture comprising α-lipoic acid and at least one of 1,2,4-benzenetriol, carnosic acid, dihydromyricetin, dihydrorobinetin, epigallocatechin, gallic acid, 3-hydroxytyrosol, myricetin, and nepodin.

Edible Oil

As used herein, the term "edible oil" means an oil suitable for human consumption. Edible oils are typically compositions including triacylglycerols ("TAG"). Edible oils useful in embodiments of the present application can be hydrogenated oils, chemically or enzymatically interesterified oils, fractionated oils, and blended oils. In some embodiments, the edible oil may be an identity-preserved oil or a genetically-modified oil. The process of hydrogenation of oils refers to the partial or complete saturation of the fatty acid components of TAG. Interesterification refers to a process where fatty acids have been rearranged on the glycerol backbone of a TAG. Fractionation refers to a process where one fraction of an oil is separated from another fraction. Typically, using temperature modification, an oil can be separated into lower and higher melting point fractions. Blending refers to a process where one or more different oils or oil fractions are mixed together.

These above-described processes can be carried out to provide an edible oil with the desired characteristics to be used in a particular application (e.g., baking, frying). More than one of these processes can be carried out to provide such an edible oil. For example, oils can be blended followed by interesterification to yield a useful edible oil. The present disclosure contemplates combinations of any of the above-described oils can be used.

Edible oils may include, without limitation, a citrus oil (e.g., lemon oil, orange oil), a coconut oil, a corn oil, a cottonseed oil, a flax seed oil, a grape seed oil, a marine oil (e.g., a fish oil, an algal oil, a fungal oil), a mustard oil, a nut oil (e.g., almond oil, cashew oil, walnut oil), an olive oil, a palm oil (and fractions), a peanut oil, a rapeseed oil (e.g., a canola oil), a rice bran oil, a safflower oil, a sesame oil, a soybean oil, a sunflower oil, or mixtures thereof.

In some embodiments, the edible oil may include one or more omega-3 fatty acids, such as, for example, α-linolenic acid ("ALA"), docosahexaenoic acid ("DHA"), eicosapentaenoic acid ("EPA"), and stearidonic acid ("SDA"). In some embodiments, the edible oil may include at least 0.05 wt. %, at least 0.1 wt. %, at least 0.2 wt. %, at least 0.3 wt. %, at least 0.4 wt. %, at least 0.5 wt. %, at least 0.6 wt. %, at least 0.7 wt. %, at least 0.8 wt. %, at least 0.9 wt. %, at least 1 wt. %, at least 1.5 wt. %, at least 2 wt. %, at least 2.5 wt. %, at least 3 wt. %, at least 3.5 wt. %, at least 4 wt. %, at least 4.5 wt. %, at least 5 wt. %, at least 5.5 wt. %, at least 6 wt. %, at least 6.5 wt. %, at least 7 wt. %, at least 7.5 wt. %, at least 8 wt. %, at least 8.5 wt. %, at least 9 wt. %, at least 9.5 wt. %, at least 10 wt. %, at least 12 wt. %, at least 14 wt. %, at least 16 wt. %, at least 18 wt. %, at least 20 wt. %, at least 22 wt. %, at least 24 wt. %, at least 26 wt. %, or at least 28 wt. % combined EPA and DHA. In some embodiments, the edible oil may include at most 33%, at most 28%, at most 23% at most 18%, at most 13%, at most 8%, at most 7%, at most 6%, at most 5%, at most 4%, at most 3%, at most 2%, or at most 1% ALA. In some embodiments, the edible oil may include at least 1%, at least 2%, at least 3%, at least 4%, at least 5%, at least 6%, at least 7%, at least 8%, at least 9%, at least 10%, at least 12%, at least 14%, at least 16%, at least 18%, or at least 20% SDA.

In some embodiments, the edible oil may be a refined oil. The term "refined oil" refers to a vegetable oil which has undergone a refining process. Refining is a process in which unwanted constituents are removed from an oil. Oils can be refined to varying degrees, and it is the desired quality of the refined oil which determines the degree of refining. Additionally, depending upon the properties of the oil desired, different processing steps can be included. Processes of refining oils are well known in the art; an exemplary description of a refining process is provided in Perkins et al., *Deep Frying: Chemistry, Nutrition, and Practical Applications*, pp. 12-24, AOCS Press, 1996.

Antioxidant Compositions

Antioxidant compositions of the present disclosure include α-lipoic acid. α-Lipoic acid, shown in Scheme 1, is an organosulfur compound having a chiral center. α-Lipoic acid is synthesized in most animals and plants, but only the (R)-(+) enantiomer is found in nature.

Scheme 1. α-lipoic acid

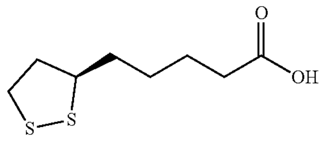

α-Lipoic acid is available commercially from Sigma-Aldrich Corp., St. Louis, Missouri, USA, in its (R)-(+) enantiomeric form and as a racemic mixture. α-Lipoic acid is also available commercially from Lalilab Incorporated, Durham, North Carolina, USA, and AnMar International Ltd., Bridgeport, Connecticut, USA.

In some embodiments, the stabilized oil may comprise at least about 100 ppm, at least about 150 ppm, at least about 200 ppm, at least about 250 ppm, at least about 300 ppm, at least about 350 ppm, at least about 400 ppm, at least about 450 ppm, at least about 500 ppm, at least about 600 ppm, or at least about 800 ppm α-lipoic acid. In some embodiments, the stabilized oil may comprise less than about 2,000 ppm, less than about 1,900 ppm, less than about 1,800 ppm, less than about 1,700 ppm, less than about 1,600 ppm, less than about 1,500 ppm, less than about 1,400 ppm, less than about 1,300 ppm, less than about 1,200 ppm, less than about 1,100 ppm, or less than about 1,000 ppm α-lipoic acid. In some embodiments, the stabilized oil may comprise about 100 ppm to about 2,000 ppm α-lipoic acid, about 250 ppm to about 1,800 ppm α-lipoic acid, about 400 ppm to about 1,600 ppm α-lipoic acid, about 600 ppm to about 1,400 ppm α-lipoic acid, or about 800 ppm to about 1,200 ppm α-lipoic acid. In some embodiments, the stabilized oil may comprise about 1,000 ppm α-lipoic acid. In addition to α-lipoic acid, antioxidant compositions of the present disclosure include at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin.

Ascorbic acid, a naturally occurring substance known to have antioxidant properties, is available from Sigma-Aldrich Corp., St. Louis, Missouri, USA and Alfa Aesar, Ward Hill, Massachusetts, USA. In some embodiments, the stabilized oil may comprise at least about 500 ppm, at least about 600 ppm, at least about 700 ppm, at least about 800 ppm, at least about 900 ppm, or at least about 1,000 ppm ascorbic acid. In some embodiments, the stabilized oil may comprise less than about 2,500 ppm, less than about 2,400 ppm, less than about 2,300 ppm, less than about 2,200 ppm, less than about 2,100 ppm, or less than about 2,000 ppm ascorbic acid. In some embodiments, the stabilized oil may comprise about 500 ppm to about 2,500 ppm ascorbic acid, about 600 ppm to about 2,400 ppm ascorbic acid, about 700 ppm to about 2,300 ppm ascorbic acid, about 800 ppm to about 2,200 ppm ascorbic acid, about 900 ppm to about 2,100 ppm ascorbic acid, or about 1,000 ppm to about 2,000 ppm ascorbic acid. In some embodiments, the stabilized oil may comprise about 1,000 ppm ascorbic acid.

Ascorbyl palmitate is a fat-soluble form of ascorbic acid available commercially from Sigma-Aldrich Corp., St. Louis, Missouri, USA. Dulcette Technologies LLC, Lindenhurst, New York, USA, and Alfa Aesar, Ward Hill, Massachusetts, USA. In some embodiments, the stabilized oil may comprise at least about 500 ppm, at least about 600 ppm, at least about 700 ppm, at least about 800 ppm, at least about 900 ppm, or at least about 1,000 ppm ascorbyl palmitate. In some embodiments, the stabilized oil may comprise less than about 2,500 ppm, less than about 2,400 ppm, less than about 2,300 ppm, less than about 2,200 ppm, less than about 2,100 ppm, or less than about 2,000 ppm ascorbyl palmitate. In some embodiments, the stabilized oil may comprise about 500 ppm to about 2,500 ppm ascorbyl palmitate, about 600 ppm to about 2,400 ppm ascorbyl palmitate, about 700 ppm to about 2,300 ppm ascorbyl palmitate, about 800 ppm to about 2,200 ppm ascorbyl palmitate, about 900 ppm to about 2,100 ppm ascorbyl palmitate, or about 1,000 ppm to about 2,000 ppm ascorbyl palmitate. In some embodiments, the stabilized oil may comprise about 1,000 ppm ascorbyl palmitate.

Green tea extracts are known to contain compounds having antioxidant activity. Green tea extracts suitable for use in embodiments of the present disclosure are commercially available under the trade name DANISCO GUARDIAN from E. I. du Pont de Nemours and Company, Wilmington, Delaware, USA. In some embodiments, the stabilized oil may comprise at least about 400 ppm, at least about 500 ppm, at least about 600 ppm, at least about 700 ppm, at least about 800 ppm, or at least about 900 ppm green tea extract. In some embodiments, the stabilized oil may comprise less than about 1,600 ppm, less than about 1,500 ppm, less than about 1,400 ppm, less than about 1,300 ppm, less than about 1,200 ppm, or less than about 1,100 ppm green tea extract. In some embodiments, the stabilized oil may comprise about 400 ppm to about 1,600 ppm green tea extract, about 500 ppm to about 1,500 ppm green tea extract, about 600 ppm to about 1,400 ppm green tea extract, about 700 ppm to about 1,300 ppm green tea extract, about 800 ppm to about 1,200 ppm green tea extract, or about 900 ppm to about 1,100 ppm green tea extract. In some embodiments, the stabilized oil may comprise about 1,000 ppm green tea extract.

Lecithins are compositions found in plants and animals; they commonly include, among other compounds, phosphatidylcholine, phosphatidylethanolamine, and phosphatidylinositol. Lecithins are used industrially for their emulsifying properties and are known to contribute to the oxidative stability of oils and fats. Lecithins useful in embodiments of the present disclosure may be derived from plant sources, such as, for example, sunflower, soy, and canola. Lecithin suitable for use in embodiments of the present disclosure are commercially available from Connoils LLC, Waukesha, Wisconsin, USA In some embodiments, the stabilized oil may comprise at least about 400 ppm, at least about 500 ppm, at least about 600 ppm, at least about 700 ppm, at least about 800 ppm, or at least about 900 ppm lecithin. In some embodiments, the stabilized oil may comprise less than about 1,600 ppm, less than about 1,500 ppm, less than about 1,400 ppm, less than about 1,300 ppm, less than about 1,200 ppm, or less than about 1,100 ppm lecithin. In some embodiments, the stabilized oil may comprise about 400 ppm to about 1,600 ppm lecithin, about 500 ppm to about 1,500 ppm lecithin, about 600 ppm to about 1,400 ppm lecithin, about 700 ppm to about 1,300 ppm lecithin, about 800 ppm to about 1,200 ppm lecithin, or about 900 ppm to about 1,100 ppm lecithin. In some embodiments, the stabilized oil may comprise about 1,000 ppm lecithin.

Rosemary extracts, commonly derived from *Rosmarinus officinalis*, are known in the art and contain compounds which have been shown to exert antioxidative functions. Rosemary extracts that may be useful in embodiments of the present disclosure are available commercially from: Danisco, Copenhagen, Denmark; Honsea Sunshine Biotech Co. Ltd., Guangzhou. China; JF-Natural, Tianjin, China; Kalsec, Inc., Kalamazoo, Michigan, USA; Kemin Industries, Inc., Des Moines, Iowa, USA; and from Naturex SA, Avignon, France, under the trade names STABILENHANCE OSR20, STABILENHANCE OSR4, and OXY'BLOCK D. In some embodiments, the stabilized oil may comprise at least about 725 ppm, at least about 750 ppm, at least about 775 ppm, at least about 800 ppm, at least about 825 ppm, at least about 850 ppm, at least about 875 ppm, at least about 900 ppm rosemary extracts, at least about 1,000 ppm, at least about 1,500 ppm, or at least about 2,000 ppm rosemary extracts. In some embodiments, the stabilized oil may comprise less than about 6,000 ppm, less than about 5,000 ppm, 4,000 ppm, less than about 3,000 ppm, less than about 2,000 ppm, less than about 1,750 ppm, less than about 1,725 ppm, less than about 1,700 ppm, or less than about 1,675 ppm rosemary extracts. In some embodiments, the stabilized oil may comprise about 725 ppm to about 6,000 ppm rosemary extracts, about 750 ppm to about 5,000 ppm rosemary extracts, about 775 ppm to about 4,000 ppm rosemary extracts, about 800 ppm to about 3,000 ppm rosemary extracts, about 825 ppm to about 2,000 ppm rosemary extracts, about 850 ppm to about 1,750 ppm rosemary extracts, about 875 ppm to about 1,725 ppm rosemary extracts, or about 900 ppm to about 1,700 ppm rosemary extracts. In some embodiments, the stabilized oil may comprise about 3,000 ppm rosemary extracts.

1,2,4-benzenetriol ("HHQ") is an aromatic polyol that occurs in nature as a biodegradation product of catechin. HHQ is commercially available from Sigma-Aldrich Corp., St. Louis, Missouri, USA. In some embodiments, the stabilized oil may comprise at least about 200 ppm, at least about 250 ppm, at least about 300 ppm, at least about 350 ppm, at least about 400 ppm, at least about 450 ppm, or at least about 500 ppm HHQ. In some embodiments, the stabilized oil may comprise less than about 1,000 ppm, less than about 950 ppm, less than about 900 ppm, less than about 850 ppm, less than about 800 ppm, less than about 750 ppm, or less than about 700 ppm HHQ. In some embodiments, the stabilized oil may comprise about 200 ppm to about 1,000 ppm HHQ, about 250 ppm to about 950 ppm HHQ, about 300 ppm to about 900 ppm HHQ, about 350 ppm to about 850 ppm HHQ, or about 400 ppm to about 800 ppm HHQ. In some embodiments, the stabilized oil may comprise about 200 ppm HHQ.

Carnosic acid, an antioxidant constituent of rosemary extract, is commercially available from ChromaDex, Inc., Irvine, California, USA. In some embodiments, the stabilized oil may comprise at least about 200 ppm, at least about 250 ppm, at least about 300 ppm, at least about 350 ppm, at least about 400 ppm, at least about 450 ppm, or at least about 500 ppm carnosic acid. In some embodiments, the stabilized oil may comprise less than about 1,000 ppm, less than about 950 ppm, less than about 900 ppm, less than about 850 ppm, less than about 800 ppm, less than about 750 ppm, or less than about 700 ppm carnosic acid. In some embodiments, the stabilized oil may comprise about 200 ppm to about 1,000 ppm carnosic acid, about 250 ppm to about 950 ppm carnosic acid, about 300 ppm to about 900 ppm carnosic acid, about 350 ppm to about 850 ppm carnosic acid, or about 400 ppm to about 800 ppm carnosic acid. In some embodiments, the stabilized oil may comprise about 1,000 ppm carnosic acid.

Dihydromyricetin ("DHM"), also known as ampelopsin, is a flavonoid that may be found in climbing shrubs belonging to the genus *Ampelopsis*. DHM is available commercially from Sigma-Aldrich Corp., St. Louis, Missouri, USA. In some embodiments, the stabilized oil may comprise at least about 200 ppm, at least about 250 ppm, at least about 300 ppm, at least about 350 ppm, at least about 400 ppm, at least about 450 ppm, or at least about 500 ppm DHM. In some embodiments, the stabilized oil may comprise less than about 1,000 ppm, less than about 950 ppm, less than about 900 ppm, less than about 850 ppm, less than about 800 ppm, less than about 750 ppm, or less than about 700 ppm DHM. In some embodiments, the stabilized oil may comprise about 200 ppm to about 1,000 ppm nepodin, about 250 ppm to about 950 ppm DHM, about 300 ppm to about 900 ppm DHM, about 350 ppm to about 850 ppm DHM, or about 400 ppm to about 800 ppm DHM. In some embodiments, the stabilized oil may comprise about 200 ppm to about 500 ppm DHM.

Dihydrorobinetin ("DHR") is a flavonoid that may be found in acacia (*Robinia pseudoacacia*) wood. DHR is available commercially from Indofine Chemical Co., Inc., Hillsborough Township, New Jersey USA). In some embodiments, the stabilized oil may comprise at least about 200 ppm, at least about 250 ppm, at least about 300 ppm, at least about 350 ppm, at least about 400 ppm, at least about 450 ppm, or at least about 500 ppm DHR. In some embodiments, the stabilized oil may comprise less than about 1,000 ppm, less than about 950 ppm, less than about 900 ppm, less than about 850 ppm, less than about 800 ppm, less than about 750 ppm, or less than about 700 ppm DHR. In some embodiments, the stabilized oil may comprise about 200 ppm to about 1,000 ppm EGC, about 250 ppm to about 950 ppm DHR, about 300 ppm to about 900 ppm DHR, about 350 ppm to about 850 ppm DHR, or about 400 ppm to about 800 ppm DHR. In some embodiments, the stabilized oil may comprise about 500 ppm to about 1,000 ppm DHR.

Epigallocatechin ("EGC") is a polyphenol antioxidant found naturally in green tea. EGC is available commercially from Indofine Chemical Co., Inc., Hillsborough Township, New Jersey, USA. In some embodiments, the stabilized oil may comprise at least about 200 ppm, at least about 250 ppm, at least about 300 ppm, at least about 350 ppm, at least about 400 ppm, at least about 450 ppm, or at least about 500 ppm EGC. In some embodiments, the stabilized oil may comprise less than about 1,000 ppm, less than about 950 ppm, less than about 900 ppm, less than about 850 ppm, less than about 800 ppm, less than about 750 ppm, or less than about 700 ppm EGC. In some embodiments, the stabilized oil may comprise about 200 ppm to about 1,000 ppm EGC, about 250 ppm to about 950 ppm EGC, about 300 ppm to about 900 ppm EGC, about 350 ppm to about 850 ppm EGC, or about 400 ppm to about 800 ppm EGC. In some embodiments, the stabilized oil may comprise about 200 ppm to about 500 ppm EGC.

Gallic acid is a phenolic acid found in many plants (e.g., sumac, witch hazel, tea leaves), and is available commercially from Sigma-Aldrich Corp., St. Louis, Missouri, USA. In some embodiments, the stabilized oil may comprise at least about 200 ppm, at least about 250 ppm, at least about 300 ppm, at least about 350 ppm, at least about 400 ppm, at least about 450 ppm, or at least about 500 ppm gallic acid. In some embodiments, the stabilized oil may comprise less than about 1,000 ppm, less than about 950 ppm, less than about 900 ppm, less than about 850 ppm, less than about 800 ppm, less than about 750 ppm, or less than about 700 ppm gallic acid. In some embodiments, the stabilized oil may comprise about 200 ppm to about 1,000 ppm gallic acid, about 250 ppm to about 950 ppm gallic acid, about 300 ppm to about 900 ppm gallic acid, about 350 ppm to about 850 ppm gallic acid, or about 400 ppm to about 800 ppm gallic acid. In some embodiments, the stabilized oil may comprise about 200 ppm to about 1,000 ppm gallic acid.

3-Hydroxytyrosol is a phenylethanoid compound with antioxidant properties that may be found in olive leaf and olive oil, 3-Hydroxytyrosol is commercially available from Cayman Chemical, Ann Arbor, Michigan, USA. In some embodiments, the stabilized oil may comprise at least about 200 ppm, at least about 250 ppm, at least about 300 ppm, at least about 350 ppm, at least about 400 ppm, at least about 450 ppm, or at least about 500 ppm 3-hydroxytyrosol. In some embodiments, the stabilized oil may comprise less than about 1,000 ppm, less than about 950 ppm, less than about 900 ppm, less than about 850 ppm, less than about 800 ppm, less than about 750 ppm, or less than about 700 ppm 3-hydroxytyrosol. In some embodiments, the stabilized oil may comprise about 200 ppm to about 1,000 ppm EGC, about 250 ppm to about 950 ppm 3-hydroxytyrosol, about 300 ppm to about 900 ppm 3-hydroxytyrosol, about 350 ppm to about 850 ppm 3-hydroxytyrosol, or about 400 ppm to about 800 ppm 3-hydroxytyrosol. In some embodiments, the stabilized oil may comprise about 500 ppm to about 1,000 ppm 3-hydroxytyrosol.

Myricetin is a flavonoid with antioxidant properties found in a variety of vegetables, fruits, nuts, berries, and teas. Myricetin is commercially available from Cayman Chemical, Ann Arbor, Michigan, USA. In some embodiments, the stabilized oil may comprise at least about 200 ppm, at least about 250 ppm, at least about 300 ppm, at least about 350 ppm, at least about 400 ppm, at least about 450 ppm, or at least about 500 ppm myricetin. In some embodiments, the stabilized oil may comprise less than about 1,000 ppm, less than about 950 ppm, less than about 900 ppm, less than about 850 ppm, less than about 800 ppm, less than about 750 ppm, or less than about 700 ppm myricetin. In some embodiments, the stabilized oil may comprise about 200 ppm to about 1,000 ppm myricetin, about 250 ppm to about 950 ppm myricetin, about 300 ppm to about 900 ppm myricetin, about 350 ppm to about 850 ppm myricetin, or about 400 ppm to about 800 ppm myricetin. In some embodiments, the stabilized oil may comprise about 200 ppm to about 500 ppm myricetin.

Nepodin (2-acetyl-1,8-dihydroxy-3-methyl naphthalene, also commonly known as musizin) is an antioxidant that may be extracted from parts of the herb *Rumex japonicus* Houtt. Nepodin is commercially available from ALB Materials Inc., Henderson, Nevada, USA. In some embodiments, the stabilized oil may comprise at least about 200 ppm, at least about 250 ppm, at least about 300 ppm, at least about 350 ppm, at least about 400 ppm, at least about 450 ppm, or at least about 500 ppm nepodin. In some embodiments, the stabilized oil may comprise less than about 1,000 ppm, less than about 950 ppm, less than about 900 ppm, less than about 850 ppm, less than about 800 ppm, less than about 750 ppm, or less than about 700 ppm nepodin. In some embodiments, the stabilized oil may comprise about 200 ppm to about 1,000 ppm nepodin, about 250 ppm to about 950 ppm nepodin, about 300 ppm to about 900 ppm nepodin, about 350 ppm to about 850 ppm nepodin, or about 400 ppm to about 800 ppm nepodin. In some embodiments, the stabilized oil may comprise about 200 ppm to about 500 ppm nepodin.

Stabilized Oil

In one aspect, stabilized oils of the present disclosure include an antioxidant mixture comprising α-lipoic acid and at least one of ascorbic acid, ascorbyl palmitate, green tea extract, lecithin, and rosemary extract.

In some embodiments, the antioxidant mixture may include α-lipoic acid and ascorbic acid. In some embodiments, the stabilized oil may include about 100 ppm to about 2,000 ppm α-lipoic acid and about 500 ppm to about 2,500 ppm ascorbic acid.

In some embodiments, the antioxidant mixture may include α-lipoic acid and ascorbyl palmitate. In some embodiments, the stabilized oil may include about 100 ppm to about 2,000 ppm α-lipoic acid and about 500 ppm to about 2,500 ppm ascorbyl palmitate.

In some embodiments, the antioxidant mixture may include α-lipoic acid, ascorbyl palmitate and green tea extract. In some embodiments, the stabilized oil may include about 100 ppm to about 2,000 ppm α-lipoic acid, about 500 ppm to about 2,500 ppm ascorbyl palmitate, and about 400 ppm to about 1,600 ppm green tea extract.

In some embodiments, the antioxidant mixture may include α-lipoic acid, ascorbyl palmitate, green tea extract, and lecithin. In some embodiments, the stabilized oil may include about 100 ppm to about 2,000 ppm α-lipoic acid, about 500 ppm to about 2,500 ppm ascorbyl palmitate, about 400 ppm to about 1,600 ppm green tea extract, and about 400 ppm to about 1,600 ppm lecithin.

In some embodiments, the antioxidant mixture may include α-lipoic acid and rosemary extract. In some embodiments, the stabilized oil may include about 100 ppm to about 2,000 ppm α-lipoic acid and about 725 ppm to about 6,000 ppm rosemary extracts.

In some embodiments, the antioxidant mixture may include α-lipoic acid, ascorbyl palmitate, and rosemary extract. In some embodiments, the stabilized oil may include about 100 ppm to about 2,000 ppm α-lipoic acid, about 500 ppm to about 2,500 ppm ascorbyl palmitate, and about 725 ppm to about 6,000 ppm rosemary extracts.

In some embodiments, the antioxidant mixture may include α-lipoic acid, ascorbic acid, and rosemary extracts. In some embodiments, the stabilized oil may include about 100 ppm to about 2,000 ppm α-lipoic acid, about 500 ppm to about 2,500 ppm ascorbic acid, and about 725 ppm to about 6,000 ppm rosemary extracts.

In another aspect, stabilized oils of the present disclosure include an antioxidant mixture comprising α-lipoic acid and at least one of 1,2,4-benzenetriol, carnosic acid, dihydromyricetin, dihydrorobinetin, epigallocatechin, gallic acid, 3-hydroxytyrosol, myricetin, and nepodin.

In some embodiments, stabilized oils of the present disclosure include an antioxidant mixture comprising α-lipoic acid and 1,2,4-benzenetriol. In some embodiments, the stabilized oil may include about 200 ppm to about 1,000 ppm α-lipoic acid and about 200 ppm to about 1,000 ppm 1,2,4-benzenetriol.

In some embodiments, stabilized oils of the present disclosure include an antioxidant mixture comprising α-lipoic acid and carnosic acid. In some embodiments, the stabilized oil may include about 1,000 ppm α-lipoic acid and about 1,000 ppm carnosic acid.

In some embodiments, stabilized oils of the present disclosure include an antioxidant mixture comprising α-lipoic acid and dihydromyricetin. In some embodiments, the stabilized oil may include about 500 ppm to about 1,000 ppm α-lipoic acid and about 200 ppm to about 500 ppm dihydromyricetin.

In some embodiments, stabilized oils of the present disclosure include an antioxidant mixture comprising α-lipoic acid and dihydrorobinetin. In some embodiments, the stabilized oil may include about 500 ppm to about 1,000 ppm α-lipoic acid and about 200 ppm to about 1,000 ppm dihydrorobinetin.

In some embodiments, stabilized oils of the present disclosure include an antioxidant mixture comprising α-lipoic acid and epigallocatechin. In some embodiments, the stabilized oil may include about 200 ppm to about 1,000 ppm α-lipoic acid and about 200 ppm to about 500 ppm epigallocatechin.

In some embodiments, stabilized oils of the present disclosure include an antioxidant mixture comprising α-lipoic acid and gallic acid. In some embodiments, the stabilized oil may include about 200 ppm to about 1,000 ppm α-lipoic acid and about 200 ppm to about 1,000 ppm gallic acid.

In some embodiments, stabilized oils of the present disclosure include an antioxidant mixture comprising α-lipoic acid and 3-hydroxytyrosol. In some embodiments, the stabilized oil may include about 200 ppm to about 1,000 ppm α-lipoic acid and about 200 ppm to about 1,000 ppm 3-hydroxytyrosol.

In some embodiments, stabilized oils of the present disclosure include an antioxidant mixture comprising α-lipoic acid and myricetin. In some embodiments, the stabilized oil may include about 500 ppm to about 1,000 ppm α-lipoic acid and about 200 ppm to about 500 ppm myricetin.

In some embodiments, stabilized oils of the present disclosure include an antioxidant mixture comprising α-lipoic acid and nepodin. In some embodiments, the stabilized oil may include about 500 ppm to about 1,000 ppm α-lipoic acid and about 200 ppm to about 500 ppm nepodin.

Stabilized oils of the present disclosure may have an Oxidative Stability Index ("OSI") at 110° C. (American Oil Chemists' Society test protocol AOCS Cd 12b-92) of at least about 30 hours, at least about 32 hours, at least about 34 hours, at least about 36 hours, at least about 38 hours, at least about 40 hours, at least about 42 hours, at least about 44 hours, at least about 46 hours, at least about 48 hours, at least about 50 hours, at least about 52 hours, at least about 54 hours, at least about 56 hours, at least about 58 hours, or at least about 60 hours.

Stabilizing an Edible Oil

In another aspect, provided are methods of preparing a stabilized edible oil. In some embodiments, the method includes providing an edible oil and adding to the edible oil an antioxidant composition, where the antioxidant composition comprises α-lipoic acid and least one of ascorbic acid, ascorbyl palmitate, green tea extract, lecithin, and rosemary extract, or the antioxidant composition comprises α-lipoic acid and at least one of 1,2,4-benzenetriol, carnosic acid, dihydromyricetin, dihydrorobinetin, epigallocatechin, gallic acid, 3-hydroxytyrosol, myricetin, and nepodin. In some embodiments, the edible oil is a marine oil (e.g., a fish oil, an algal oil, a fungal oil). In some embodiments, the edible oil is a blend of a marine oil (e.g., a fish oil, an algal oil, a fungal oil) and a vegetable oil. In some embodiments, the edible oil is a vegetable oil.

Methods of combining edible oils with other materials, such as, for example, an antioxidant composition including α-lipoic acid and at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin are known to those of ordinary skill in the relevant arts.

In some embodiments, the antioxidant composition may be added to an edible oil at room temperature (e.g., about 23° C.). In some embodiments, the antioxidant composition may be added to a heated edible oil, for example, an edible oil heat from about 23° C. to about 60° C.

In some embodiments, the antioxidant composition including α-lipoic acid and at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin may be prepared as a mixture prior to addition to the edible oil. In some embodiments, the mixture prepared prior to addition to the edible oil may include an organic solvent (e.g., acetone).

In some embodiments, the α-lipoic acid and at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin may be added sequentially to the edible oil, e.g., the α-lipoic acid may be added first to the edible oil, followed by the addition of at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin, or at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin and nepodin may be added first to the edible oil, followed by the addition of α-lipoic acid. In some embodiments, the α-lipoic acid may be added during the addition of at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin to the edible oil.

The concentrations and types of α-lipoic acid, ascorbic acid, ascorbyl palmitate, green tea extract, lecithin, rosemary extract, 1,2,4-benzenetriol, carnosic acid, dihydromyricetin, dihydrorobinetin, epigallocatechin, gallic acid, 3-hydroxytyrosol, myricetin, and nepodin which can be added to an edible oil to yield a stabilized oil are those described above for the stabilized oil.

The addition of α-lipoic acid and at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin to an edible oil provides an oil which shows surprisingly enhanced stabilization in OSI testing. This effect can be best examined when the stabilized oil of the present disclosure is compared to the same edible oil without the addition of α-lipoic acid and at least one of ascorbic acid, ascorbyl palmitate, green tea extract, lecithin, and rosemary extracts or at least one of 1,2,4-benzenetriol, carnosic acid, dihydromyricetin, dihydrorobinetin, epigallocatechin, gallic acid, 3-hydroxytyrosol, myricetin, and nepodin after both are heated for extended periods of time. In the subsequent Example section, this benefit is exemplified in Examples 1 and 2, which show the difference in OSI value of an edible oil without added α-lipoic acid and at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin and the OSI value of an edible oil to which α-lipoic acid and at least one of ascorbic acid, ascorbyl palmitate, green tea extract, lecithin, and rosemary extract or at least one of 1,2,4-benzenetriol, carnosic acid, dihydromyricetin, dihydrorobinetin, epigallocatechin, gallic acid, 3-hydroxytyrosol, myricetin, and nepodin have been added before heating.

EXAMPLES

Aspects of certain embodiments in accordance with aspects of the disclosure are illustrated in the following Examples. The materials and methods described in these Examples are illustrative and not intended to be limiting.

Experimental Procedures

Oxidative Stability Index ("OSI"): The OSI measurements were carried out in accordance with AOCS Cd 12b-92 at 110° C. with a 743 RANCIMAT analyzer (Metrohm AG, Herisau, Switzerland) generally in accordance with American Oil Chemists' Society test protocol AOCS Cd 12b-92, except that the sample size of the oil is 3.0 g.

Fatty acid profile (wt %) determination: In accordance with American Oil Chemist's Society Official Method AOCS Ce 1i-07, the oil is treated to convert acylglycerols to fatty acid methyl esters ("FAME") and vials of the FAME are placed in a gas chromatograph for analysis in accordance with American Oil Chemist's Society Official Method AOCS Ce 1i-07. This modified chromatography employs an Agilent 7890A gas chromatograph (Agilent Technologies, Santa Clara, California) equipped with a fused silica capillary column (30 m×0.25 mm and 0.25 μm film thickness) packed with a polyethylene glycol based DB-WAX for liquid phase separation (J&W Scientific, Folsom, California). Hydrogen ($H_2$) is used as the carrier gas at a flow rate of 1.2 mL/min and the column initial temperature is 170° C., ramp 1° C./min, final temperature is 225° C.

Schaal Oven Test (AOCS Cg 5-97): The oil is placed in amber glass bottles and the bottles are stored, open to ambient air, in an electrically heated convection oven held at 60° C. The oil is periodically assessed, e.g., by measuring peroxide values and/or conducting sensory testing. This method is commonly referred to as the "Schaal Oven" method and is widely used as an accelerated aging test of shelf stability for oil substrates.

Peroxide Value: Conducted in accordance with American Oil Chemist's Society Official Method AOCS Cd 8b-90.

Materials

α-Lipoic acid (Lalilab Incorporated, Durham, North Carolina, USA, and AnMar International Ltd., Bridgeport, Connecticut, USA), ascorbic acid (Alfa Aesar, Ward fill, Massachusetts, USA), ascorbyl palmitate (Alfa Aesar, Ward Hill, Massachusetts, USA), 1,2,4-benzenetriol (Sigma-Aldrich Corp., St. Louis, Missouri, USA), carnosic acid (ChromaDex, Inc., Irvine, California, USA), dihydromyricetin (Sigma-Aldrich Corp., St. Louis, Missouri, USA), dihydrorobinetin (Indofine Chemical Co., Inc., Hillsborough Township, New Jersey, USA), epigallocatechin (Indofine Chemical Co., Inc., Hillsborough Township, New Jersey, USA), DANISCO GUARDIAN green tea extract (E. I. du Pont de Nemours and Company, Wilmington, Delaware, USA), gallic acid (Sigma-Aldrich Corp., St. Louis, Missouri, USA), 3-hydroxytyrosol (Cayman Chemical, Ann Arbor, Michigan, USA), lecithin (Connoils LLC, Waukesha, Wisconsin, USA), myricetin (Cayman Chemical, Ann Arbor, Michigan, USA), nepodin (ALB Materials Inc., Henderson, Nevada, USA), HONSEA 60 rosemary extract (Honsea Sunshine Biotech Co. Ltd., Guangzhou, China), OXY'BLOCK D 150821 (Naturex SA, Avignon, France), CLEAR VALLEY 80-brand canola oil ("CV80") (Cargill, Incorporated, Wayzata, Minnesota, USA), and MEG3 Sardine Anchovy 29% K Food Oil fish oil (Ocean Nutrition Canada Limited, Dartmouth, Nova Scotia, Canada).

Example 1: OSI of Edible Oils Including Antioxidant Compositions

A blend of CV80 and fish oil ("CV80/fish") is prepared by combining CV80 (800.00 g) and MEG3 Sardine Anchovy fish oil (200.02 g). The CV80/fish oil is combined with antioxidant to provide oil samples having concentrations as shown in Table 1. OSI testing was performed on each of the samples as set forth above. The results of the OSI tests are set forth in Table 1.

Antioxidant synergy, additive effects, or antagonistic effects are calculated using the following Formula 1 (de Guzman et al., *J Am Oil Chem Soc,* 2009, 86 (5):459-467):

$$(RT_{Mix}-RT_{Control})-[(RT_{Additive1}-RT_{Control})+(RT_{Additive2}-RT_{Control})]=\text{Antioxidant Effect}$$

where RT=RANCIMAT Time.

Synergy of antioxidant mixtures in the oil is demonstrated by Antioxidant Effect values of >0.8, an additive effect is demonstrated by Antioxidant Effect values of ±0.8, and an antagonistic effect of the antioxidant mixtures is demonstrated by Antioxidant Effect values of <−0.8.

TABLE 1

OSI of CV80/Fish Oil Blend Including Antioxidants

| Antioxidant Composition | Added Antioxidant Concentration in Oil (ppm) | OSI (hours) | Antioxidant Effect Calculation | Antioxidant Effect Relationship |
|---|---|---|---|---|
| None | None | 9.5 | NA | NA |
| α-Lipoic acid (Lalilab) | 200 | 10.3 | NA | NA |
| α-Lipoic acid (Lalilab) | 500 | 11.2 | NA | NA |
| α-Lipoic acid (Lalilab) | 700 | 12.2 | NA | NA |
| α-Lipoic acid (Lalilab) | 1000 | 13.5 | NA | NA |
| α-Lipoic acid (AnMar) | 1000 | 13.6 | NA | NA |
| Ascorbic acid | 200 | 9.7 | NA | NA |
| Ascorbic acid | 500 | 10.56 | NA | NA |
| Ascorbic acid | 700 | 10.42 | NA | NA |
| Ascorbic acid | 1000 | 12.84 | NA | NA |
| Ascorbyl palmitate | 200 | 13.23 | NA | NA |
| Ascorbyl palmitate | 500 | 17.44 | NA | NA |
| Ascorbyl palmitate | 700 | 19.1 | NA | NA |
| Ascorbyl palmitate | 1000 | 20.67 | NA | NA |
| Green tea extract | 500 | 13.37 | NA | NA |
| Green tea extract | 1000 | 14.06 | NA | NA |
| Green tea extract | 2000 | 16.82 | NA | NA |
| Green tea extract | 3000 | 17.84 | NA | NA |
| Lecithin | 500 | 10.87 | NA | NA |
| Lecithin | 1000 | 11.48 | NA | NA |
| Lecithin | 2000 | 13.1 | NA | NA |
| Lecithin | 3000 | 16.99 | NA | NA |
| Oxyblock D150821 NATUREX | 3000 | 31.1 | NA | NA |
| Rosemary extract (Honsea 60) | 3000 | 22.04 | NA | NA |
| α-Lipoic acid/ Ascorbyl palmitate | 1000/1000 | 37.1 | 12.43 | Synergy |
| α-Lipoic acid/ Ascorbyl palmitate/ Lecithin | 1000/1000/1000 | 41 | 14.35 | Synergy |
| α-Lipoic acid/ Ascorbyl palmitate/ Green tea extract | 1000/1000/1000 | 39 | 9.77 | Synergy |
| α-Lipoic acid/ Ascorbyl palmitate/ Green tea extract/Lecithin | 1000/1000/ 1000/707 | 46 | 14.79 | Synergy |
| α-Lipoic acid/ NATUREX | 1000/3000 | 44.5 | 9.4 | Synergy |
| α-Lipoic acid/ Ascorbyl palmitate/NATUREX | 1000/1000/3000 | 46.98 | 0.71 | Additive |
| Rosemary extract/Ascorbyl palmitate/a-lipoic; acid | 1000/1000/1000 | 34.8 | | |
| Rosemary extract/Ascorbyl palmitate/α-Lipoic acid | 3000/1000/200 | 33.93 | −0.08 | Additive |
| Rosemary extract/Ascorbyl palmitate/α-Lipoic acid | 3000/1000/500 | 32.59 | −2.32 | Antagonistic |
| Rosemary extract/Ascorbyl palmitate/α-Lipoic acid | 3000/1000/ 1000 | 35.37 | −1.84 | Antagonistic |
| Rosemary extract/Ascorbyl palmitate/α-Lipoic acid | 3000/2000/ 1000 | 41.46 | | |

As shown in Table 1, an edible oil comprising α-lipoic acid in combination with at least a second antioxidant. i.e., ascorbic acid, ascorbyl palmitate, green tea extract, lecithin, or rosemary extract, exhibits surprisingly high stability at certain concentrations of α-lipoic acid and the second antioxidant(s), i.e., where the Antioxidant Effect values are >0.8.

Example 2: OSI of Edible Oils Including Antioxidant Compositions

A blend of CV80 and fish oil ("CV80/fish") is prepared by combining CV80 (800.00 g) and MEG3 Sardine Anchovy fish oil (200.02 g). An aliquot of the CV80/fish oil blend (15.00 g) is combined with antioxidant dissolved in acetone (0.5 mL) to provide oil samples having antioxidant concentrations as shown in Table 2. Acetone (0.5 mL) without added antioxidant is added to the control aliquot. The oil samples are placed in a fume hood under a nitrogen stream for about tour hours to remove all traces of the acetone before OSI testing. OSI testing is performed on each of the samples as set forth above. The results of the OSI tests are set forth in Table 2.

Antioxidant synergy, additive effects, or antagonistic effects are calculated using Formula 1 as shown in Example 1. Synergy of antioxidant mixtures in the oil is demonstrated by Antioxidant Effect values of >0.8, an additive effect is demonstrated by Antioxidant Effect values of ±0.8, and an antagonistic effect of the antioxidant mixtures is demonstrated by Antioxidant Effect values of <−0.8.

TABLE 2

OSI of CV80/Fish OH Blend Including Antioxidants

| Antioxidant Composition | Added Antioxidant Concentration in Oil (ppm) | OSI (hours) | Antioxidant Effect Calculation Using Formula 1 | Antioxidant Effect Relationship |
|---|---|---|---|---|
| None | None | 10.22 | NA | NA |
| α-Lipoic acid | 200 | 11.24 | NA | NA |
| α-Lipoic acid | 500 | 12.11 | NA | NA |
| α-Lipoic acid | 1000 | 14.31 | NA | NA |
| 1,2,4-Benzenetriol | 200 | 28.54 | NA | NA |
| 1,2,4-Benzenetriol | 500 | 43.23 | NA | NA |
| 1,2,4-Benzenetriol | 1000 | 53.00 | NA | NA |
| Carnosic acid | 200 | 14.36 | NA | NA |
| Carnosic acid | 500 | 15.25 | NA | NA |
| Carnosic acid | 1000 | 18.22 | NA | NA |
| Dihydromyricetin | 200 | 14.03 | NA | NA |
| Dihydromyricetin | 500 | 20.32 | NA | NA |
| Dihydromyricetin | 1000 | 25.56 | NA | NA |
| Dihydrorobinetin | 200 | 15.64 | NA | NA |
| Dihydrorobinetin | 500 | 22.47 | NA | NA |
| Dihydrorobinetin | 1000 | 27.24 | NA | NA |
| Epigallocatechin | 200 | 13.42 | NA | NA |
| Epigallocatechin | 50011 | 17.49 | NA | NA |
| Epigallocatechin | 1000 | 25.74 | NA | NA |
| Gallic acid | 200 | 14.74 | NA | NA |
| Gallic acid | 500 | 21.53 | NA | NA |
| Gallic acid | 10000 | 28.34 | NA | NA |
| 3-Hydroxytyrosol | 200 | 13.42 | NA | NA |
| 3-Hydroxytyrosol | 500 | 16.14 | NA | NA |
| 3-Hydroxytyrosol | 1000 | 19.19 | NA | NA |
| Myricetin | 200 | 13.17 | NA | NA |
| Myricetin | 500 | 17.87 | NA | NA |
| Myricetin | 1000 | 23.34 | NA | NA |
| Nepodin | 200 | 21.18 | NA | NA |
| Nepodin | 500 | 35.29 | NA | NA |
| Nepodin | 1000 | 46.78 | NA | NA |
| α-Lipoic acid/1,2,4-benzenetriol | 200/200 | 31.35 | 1.79 | Synergy |
| α-Lipoic acid/1,2,4-benzenetriol | 200/500 | 46.73 | 2.48 | Synergy |
| α-Lipoic acid/1,2,4-Benzenetriol | 200/1000 | 53.84 | −0.18 | Additive |
| α-Lipoic acid/1,2,4-Benzenetriol | 500/200 | 35.92 | 5.49 | Synergy |
| α-Lipoic acid/1,2,4-Benzenetriol | 500/500 | 48.51 | 3.39 | Synergy |
| α-Lipoic acid/1,2,4-Benzenetriol | 500/1000 | 59.60 | 4.71 | Synergy |
| d-Lipoic acid/1,2,4-Benzenetriol | 1000/200 | 41.97 | 9.34 | Synergy |
| α-Lipoic acid/1,2,4-Benzenetriol | 1000/500 | 52.30 | 4.98 | Synergy |
| α-Lipoic acid/1,2,4-Benzenetriol | 1000/1000 | 61.63 | 4.54 | Synergy |
| α-Lipoic acid/Carnosic acid | 200/200 | 14.72 | −0.66 | Additive |
| α-Lipoic acid/Carnosic acid | 200/500 | 16.39 | 0.12 | Additive |

TABLE 2-continued

OSI of CV80/Fish OH Blend Including Antioxidants

| Antioxidant Composition | Added Antioxidant Concentration in Oil (ppm) | OSI (hours) | Antioxidant Effect Calculation Using Formula 1 | Antioxidant Effect Relationship |
|---|---|---|---|---|
| α-Lipoic acid/Carnosic acid | 200/1000 | 17.34 | −1.90 | Antagonistic |
| α-Lipoic acid/Carnosic acid | 500/200 | 15.18 | −1.07 | Antagonistic |
| α-Lipoic acid/Carnosic acid | 500/500 | 17.56 | 0.42 | Additive |
| α-Lipoic acid/Carnosic acid | 500/1000 | 19.92 | −0.19 | Additive |
| α-Lipoic acid/Carnosic acid | 1000/200 | 16.30 | −2.15 | Antagonistic |
| α-Lipoic acid/Carnosic acid | 1000/500 | 19.95 | 0.61 | Additive |
| α-Lipoic acid/Carnosic acid | 1000/1000 | 25.05 | 2.74 | Synergy |
| α-Lipoic acid/Dihydromyricetin | 200/200 | 15.40 | 0.35 | Additive |
| α-Lipoic acid/Dihydromyricetin | 200/500 | 20.02 | −1.32 | Antagonistic |
| jα-Lipoic acid/Dihydromyricetin | 200/1000 | 22.88 | −3.70 | Antagonistic |
| α-Lipoic acid/Dihydromyricetin | 500/200 | 17.27 | 1.35 | Synergy |
| α-Lipoic acid/Dihydromyricetin | 500/500 | 22.59 | 0.38 | Additive |
| α-Lipoic acid/Dihydromyricetin | 500/1000 | 24.23 | −3.22 | Antagonistic |
| α-Lipoic acid/Dihydromyricetin | 1000/200 | 19.94 | 1.82 | Synergy |
| α-Lipoic acid/Dihydromyricetin | 1000/500 | 25.86 | 1.45 | Synergy |
| α-Lipoic acid/Dihydromyricetin | 1000/1000 | 30.38 | 0.73 | Additive |
| α-Lipoic acid/Dihydrorobinetin | 200/200 | 13.29 | −3.37 | Antagonistic |
| α-Lipoic acid/Dihydrorobinetin | 200/500 | 22.56 | −0.93 | Antagonistic |
| α-Lipoic acid/Dihydrorobinetin | 200/1000 | 26.81 | −1.45 | Antagonistic |
| α-Lipoic acid/Dihydrorobinetin | 500/200 | 18.47 | 4.75 | Synergy |
| α-Lipoic acid/Dihydrorobinetin | 500/500 | 27.58 | 3.22 | Synergy |
| α-Lipoic acid/Dihydrorobinetin | 500/1000 | 30.81 | 1.68 | Synergy |
| α-Lipoic acid/Dihydrorobinetin | 1000/200 | 21.07 | 1.34 | Synergy |
| α-Lipoic acid/Dihydrorobinetin | 1000/500 | 30.67 | 4.11 | Synergy |
| α-Lipoic acid/Dihydrorobinetin | 1000/1000 | 33.90 | 2.57 | Synergy |
| α-Lipoic acid/Epigallocatechin | 200/200 | 16.82 | 2.38 | Synergy |
| α-Lipoic acid/Epigallocatechin | 200/500 | 22.74 | 4.23 | Synergy |
| α-Lipoic acid/Epigallocatechin | 200/1000 | 26.25 | −0.51 | Additive |
| α-Lipoic acid/Epigallocatechin | 500/200 | 18.56 | 3.25 | Synergy |
| α-Lipoic acid/Epigallocatechin | 500/500 | 25.24 | 5.86 | Synergy |
| α-Lipoic acid/Epigallocatechin | 500/1000 | 28.17 | 0.54 | Additive |
| α-Lipoic acid/Epigallocatechin | 1000/200 | 21.50 | 3.99 | Synergy |
| α-Lipoic acid/Epigallocatechin | 1000/500 | 25.64 | 4.06 | Synergy |
| α-Lipoic acid/Epigallocatechin | 8000/1000 | 29.30 | −0.53 | Additive |
| α-Lipoic acid/Gallic acid | 200/200 | 17.05 | 1.29 | Synergy |
| α-Lipoic acid/Gallic acid | 200/500 | 24.43 | 1.88 | Synergy |
| α-Lipoic acid/Gallic acid | 200/1000 | 30.81 | 1.45 | Synergy |
| α-Lipoic acid/Gallic acid | 500/200 | 19.21 | 2.58 | Synergy |

TABLE 2-continued

OSI of CV80/Fish OH Blend Including Antioxidants

| Antioxidant Composition | Added Antioxidant Concentration in Oil (ppm) | OSI (hours) | Antioxidant Effect Calculation Using Formula 1 | Antioxidant Effect Relationship |
|---|---|---|---|---|
| α-Lipoic acid/Gallic acid | 500/500 | 29.26 | 5.84 | Synergy |
| α-Lipoic acid/Gallic acid | 500/1000 | 33.43 | 3.20 | Synergy |
| α-Lipoic acid/Gallic acid | 1000/200 | 30.81 | 11.98 | Synergy |
| α-Lipoic acid/Gallic acid | 1000/500 | 33.54 | 7.92 | Synergy |
| α-Lipoic acid/Gallic acid | 1000/1000 | 36.56 | 4.13 | Synergy |
| α-Lipoic acid/3-Hydroxytyrosol | 500/200 | 14.31 | −1.00 | Antagonistic |
| α-Lipoic acid/3-Hydroxytyrosol | 500/500 | 18.28 | 0.25 | Additive |
| α-Lipoic acid/3-Hydroxytyrosol | 500/1000 | 21.21 | 0.131 | Additive |
| α-Lipoic acid/3-Hydroxytyrosol | 1000/200 | 15.72 | −1.79 | Antagonistic |
| α-Lipoic acid/3-Hydroxytyrosol | 1000/500 | 19.98 | −0.25 | Additive |
| α-Lipoic acid/3-Hydroxytyrosol | 1000/1000 | 22.85 | −0.43 | Additive |
| α-Lipoic acid/Myricetin | 200/200 | 14.61 | 0.42 | Additive |
| α-Lipoic acid/Myricetin | 200/500 | 17.98 | −0.91 | Antagonistic |
| α-Lipoic acid/Myricetin | 200/1000 | 24.20 | −0.16 | Additive |
| α-Lipoic acid/Myricetin | 500/200 | 16.27 | 1.21 | Synergy |
| α-Lipoic acid/Myricetin | 500/500 | 23.26 | 3.50 | Synergy |
| α-Lipoic acid/Myricetin | 500/1000 | 25.58 | 0.35 | Additive |
| α-Lipoic acid/Myricetin | 1000/200 | 18.98 | 1.72 | Synergy |
| α-Lipoic acid/Myricetin | 1000/500 | 24.37 | 2.41 | Synergy |
| α-Lipoic acid/Myricetin | 1000/1000 | 28.04 | 0.61 | Additive |
| α-Lipoic acid/Nepodin | 200/200 | 20.93 | −1.27 | Antagonistic |
| α-Lipoic acid/Nepodin | 200/500 | 36.76 | 0.45 | Additive |
| α-Lipoic acid/Nepodin | 200/1000 | 47.140 | −0.66 | Additive |
| α-Lipoic acid/Nepodin | 500/200 | 25.10 | 2.03 | Synergy |
| α-Lipoic acid/Nepodin | 500/500 | 39.59 | 2.41 | Synergy |
| α-Lipoic acid/Nepodin | 500/1000 | 48.85 | 0.18 | Additive |
| α-Lipoic acid/Nepodin | 1000/200 | 29.00 | 3.73 | Synergy |
| α-Lipoic acid/Nepodin | 1000/500 | 42.28 | 2.90 | Synergy |
| α-Lipoic acid/Nepodin | 1000/1000 | 150.55 | −0.32 | Additive |

As shown in Table 2, an edible oil comprising α-lipoic acid in combination with a second antioxidant, i.e., 1,2,4-benzenetriol, carnosic acid, dihydromyricetin, dihydrorobinetin, epigallocatechin, gallic acid, 3-hydroxytyrosol, myricetin, or nepodin exhibits surprisingly high stability at certain concentrations of α-lipoic acid and the second antioxidant, i.e., where the Antioxidant Effect values are >0.8.

What is claimed is:

1. A stabilized oil comprising:
   an edible oil; and
   an antioxidant composition,
   wherein the antioxidant composition comprises:
      α-lipoic acid;
      at least one of 1,2,4-benzenetriol, carnosic acid, dihydromyricetin, dihydrorobinetin, epigallocatechin, gallic acid, myricetin, and nepodin; and
      no more than 1600 ppm of phospholipid based on a total amount of the stabilized oil, wherein the stabilized oil has an α-lipoic acid concentration of from about 100 ppm to about 2,000 ppm.

2. The stabilized oil of claim 1, wherein the edible oil comprises a soybean oil, a palm oil, a canola oil, a corn oil, an olive oil, a peanut oil, a sunflower oil, a sesame oil, a safflower oil, a marine oil, or mixtures thereof.

3. The stabilized oil of claim 2, wherein the edible oil comprises a polyunsaturated fat selected from the group consisting of ALA, EPA, and DHA.

4. The stabilized oil of claim 1, wherein the stabilized oil has an α-lipoic acid concentration of from about 200 ppm to about 1,000 ppm.

5. The stabilized oil of claim 1, comprising from about 200 ppm to about 1,000 ppm 1,2,4-benzentriol.

6. The stabilized oil of claim 1, comprising about 1,000 ppm α-lipoic acid and about 1,000 ppm carnosic acid.

7. The stabilized oil of claim 1, comprising from about 200 ppm to about 500 ppm dihydromyricetin.

8. The stabilized oil of claim 1, comprising from about 200 ppm to about 1,000 ppm dihydrorobinetin.

9. The stabilized oil of claim 1, comprising from about 200 ppm to about 500 ppm epigallocatechin.

10. The stabilized oil of claim 1, comprising from about 200 ppm to about 1,000 ppm gallic acid.

11. The stabilized oil of claim 1, comprising from about 200 ppm to about 500 ppm myricetin.

12. The stabilized oil of claim 1, comprising from about 200 ppm to about 500 ppm nepodin.

13. A method for preparing a stabilized oil, the method comprising:
   providing an edible oil; and
   adding an antioxidant composition to the edible oil to provide a stabilized oil, the antioxidant composition comprising:
      α-lipoic acid;
      at least one of 1,2,4-benzenetriol, carnosic acid, dihydromyricetin, dihydrorobinetin, epigallocatechin, gallic acid, myricetin, and nepodin; and no more than 1600 ppm of phospholipid based on a total amount of the stabilized oil, wherein the stabilized oil has an α-lipoic acid concentration of from about 100 ppm to about 2,000 ppm.

14. The method of claim 13, wherein the edible oil comprises a soybean oil, a palm oil, a canola oil, a corn oil, an olive oil, a peanut oil, a sunflower oil, a sesame oil, a safflower oil, a marine oil, or mixtures thereof.

15. The method of claim 13, wherein the edible oil comprises a polyunsaturated fat selected from the group consisting of ALA, EPA, and DHA.

16. The method of claim 13, wherein the stabilized oil has an α-lipoic acid concentration from about 200 ppm to about 1,000 ppm.

17. The method of claim 13, wherein the stabilized oil has a 1,2,4-benzenetriol concentration of from about 200 ppm to about 1,000 ppm.

18. The method of claim 13, wherein the stabilized oil has an α-lipoic acid concentration of about 1,000 ppm and a carnosic acid concentration of about 1,000 ppm.

19. The method of claim 13, comprising from about 200 ppm to about 500 ppm dihydromyricetin.

20. The method of claim 13, comprising from about 200 ppm to about 1,000 ppm dihydrorobinetin.

21. The method of claim 13, wherein the stabilized oil has an epigallocatechin concentration of from about 200 ppm to about 500 ppm.

22. The method of claim 13, wherein the stabilized oil has a gallic acid concentration of from about 200 ppm to about 1,000 ppm.

23. The method of claim 13, wherein the stabilized oil has a myricetin concentration of from about 200 ppm to about 500 ppm.

24. The method of claim 13, wherein the stabilized oil has from about 200 ppm to about 500 ppm nepodin.

25. The method of claim 13, wherein the stabilized oil has an Oxidative Stability Index at 110° C. of at least 30 hours.

26. A stabilized oil comprising:

an edible oil; and an antioxidant composition, wherein the antioxidant composition comprises:

α-lipoic acid;

at least one of 1,2,4-benzenetriol, carnosic acid, dihydromyricetin, dihydrorobinetin, epigallocatechin, gallic acid, myricetin, and nepodin; and no more than 1600 ppm of phospholipid based on a total amount of the stabilized oil, wherein the stabilized oil has an α-lipoic acid concentration of from about 100 ppm to about 2,000 ppm, and wherein the stabilized oil has at least a synergistic amount of the at least one of 1,2,4-benzenetriol, carnosic acid, dihydromyricetin, dihydrorobinetin, epigallocatechin, gallic acid, myricetin, and nepodin.

27. The stabilized oil of claim 1, wherein the phospholipid comprises one or more of phosphatidylcholine, phosphatidylethanolamine, and phosphatidylinositol, and wherein the phospholipid is included in the stabilized oil at a concentration of 400 ppm to 1500 ppm.

28. The method of claim 13, wherein the phospholipid comprises one or more of phosphatidylcholine, phosphatidylethanolamine, and phosphatidylinositol, and wherein the phospholipid is included in the stabilized oil at a concentration of 400 ppm to 1500 ppm.

29. The stabilized oil of claim 26, wherein the phospholipid comprises one or more of phosphatidylcholine, phosphatidylethanolamine, and phosphatidylinositol, and wherein the phospholipid is included in the stabilized oil at a concentration of 400 ppm to 1500 ppm.

* * * * *